(12) United States Patent
Aburaya (10) Patent No.: US 10,649,646 B2
(45) Date of Patent: May 12, 2020

(54) INFORMATION PROCESSING APPARATUS AND METHOD FOR NOTIFYING CAUSE FOR FAILURE IN RECEPTION OF INPUT OPERATION

(71) Applicant: TOSHIBA TEC KABUSHIKI KAISHA, Tokyo (JP)

(72) Inventor: Yusuke Aburaya, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/029,293

(22) Filed: Jul. 6, 2018

(65) Prior Publication Data
US 2019/0026002 A1 Jan. 24, 2019

(30) Foreign Application Priority Data
Jul. 19, 2017 (JP) .................. 2017-139927

(51) Int. Cl.
*G06F 3/0488* (2013.01)
*G07G 1/01* (2006.01)
*G06Q 20/20* (2012.01)
*G06F 3/044* (2006.01)

(52) U.S. Cl.
CPC ............ *G06F 3/0488* (2013.01); *G06F 3/044* (2013.01); *G06Q 20/202* (2013.01); *G07G 1/01* (2013.01); *G06F 2203/04808* (2013.01)

(58) Field of Classification Search
CPC .............. G06F 3/0488; G06F 3/044; G06F 2203/04808; G06Q 20/202; G07G 1/01
See application file for complete search history.

(56) References Cited

U.S. PATENT DOCUMENTS

| 2003/0025738 A1* | 2/2003 | Polgar | G06F 3/04886 715/835 |
| 2009/0189877 A1 | 7/2009 | Washino et al. | |
| 2014/0327805 A1* | 11/2014 | Oyama | G06F 3/0416 348/333.02 |
| 2015/0248700 A1* | 9/2015 | Fujiwara | G06Q 30/0257 705/14.55 |
| 2016/0232506 A1* | 8/2016 | Gotanda | G06Q 20/204 |

FOREIGN PATENT DOCUMENTS

JP 2009-176114 A 8/2009

OTHER PUBLICATIONS

Extended European Search Report dated Nov. 15, 2018, filed in counterpart European Patent Application No. 18184462.2, 9 pages.

* cited by examiner

*Primary Examiner* — Mark W Regn
(74) *Attorney, Agent, or Firm* — Kim & Stewart LLP (57) ABSTRACT

In accordance with an embodiment, an information processing apparatus includes a touch panel, a processor configured to detect that the touch panel is being pressed at a first position, acquire a first position coordinate of the first position when the touch panel is detected as being pressed at the first position, and determine whether the touch panel has been continuously pressed at a second position for a reference period or more, and a controller configured to provide a notification if the touch panel has been continuously pressed at the second position for the reference period or more.

14 Claims, 5 Drawing Sheets

INFORMATION PROCESSING APPARATUS AND METHOD FOR NOTIFYING CAUSE FOR FAILURE IN RECEPTION OF INPUT OPERATION

CROSS-REFERENCE TO RELATED APPLICATION

This application is based upon and claims the benefit of priority from Japanese Patent Application No. 2017-139927, filed Jul. 19, 2017, the entire contents of which are incorporated herein by reference.

FIELD

Embodiments described herein relate generally to an information processing apparatus and a method for notifying a cause for failure in reception of an input operation.

BACKGROUND

In an existing POS (Point-of-Sale) terminal, a user presses a touch panel for an input operation. However, in some instances, the touch panel can receive "a multi-point input" and it can be difficult to correctly detect the specific input operation intended by the user. For example, a multi-point input may occur if the touch panel is accidentally pressed by a surrounding object while the user makes an input. In such a case, it is difficult to correctly select an input operation intended by a user. Furthermore, the user may not recognize the wrong selection was made on the touch panel, or be able to determine the reason why the POS terminal does not display the intended selection, and thus, the user may mistakenly determine that the touch panel is broken.

If a touch panel can notify a user that the touch panel has been erroneously pressed, it is possible to simplify an operation of the touch panel for the user.

DETAILED DESCRIPTION

In accordance with an embodiment, an information processing apparatus includes a touch panel, a processor configured to detect that the touch panel is being pressed at a first position, acquire a first position coordinate of the first position when the touch panel is detected as being pressed at the first position, and determine whether the touch panel has been continuously pressed at a second position for a reference period or more, and a controller configured to provide a notification if the touch panel has been continuously pressed at the second position for the reference period or more.

Figure 1:
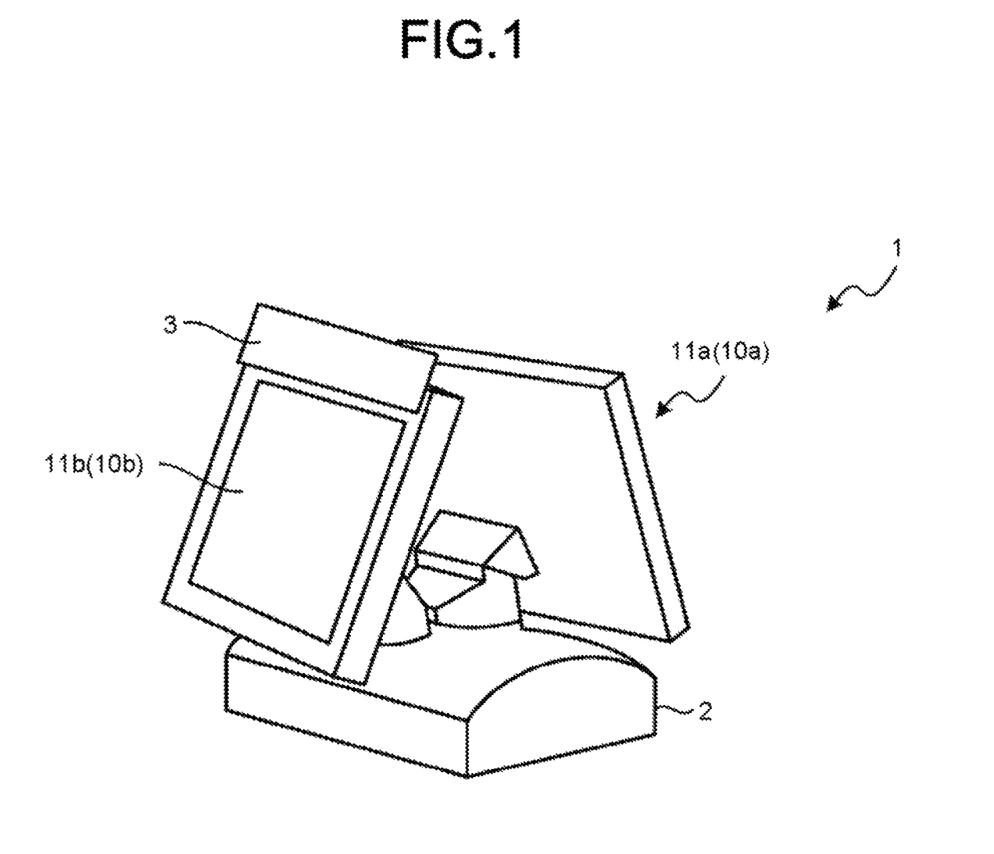
FIG. 1 is an external perspective view of a POS terminal according to an embodiment.

FIG. 1 is an external perspective view of a POS (Point-of-Sale) terminal 1 according to an example embodiment. As shown in FIG. 1, the POS terminal 1 includes a housing 2, a customer display 11b, a customer touch panel 10b laminated on the customer display 11b, a store display 11a, and a store touch panel 10a laminated on the store display 11a.

The POS terminal 1 is installed in a retail store and functions as a checkout apparatus for registering sales data of a commodity that a customer purchases. If the registration of the sales data is completed, the POS terminal 1 may transmit the sales data to a printer (not specifically depicted) to issue a purchase receipt on which details relating to the commodity purchased by the customer are printed. The POS terminal 1 may include a drawer, a keyboard, a scanner (not specifically depicted), and the like.

It should be noted that the POS terminal 1 explained below is one example of an information processing apparatus according to the present disclosure and does not limit the possible configurations, specifications, or the like of information processing apparatuses according to the present disclosure.

The store display 11a and the store touch panel 10a are installed to face a store clerk. The store touch panel 10a receives inputs from the store clerk. The store display 11a presents information to the store clerk. For example, on the store display 11a, various button images such as a commodity button for selecting a commodity being purchased by the customer and operation buttons for registration operations are displayed.

The customer display 11b and the customer touch panel 10b are installed on back surfaces of the store display 11a and the store touch panel 10a facing the customer. The customer touch panel 10b receives inputs from the customer. On the customer display 11b, for example, the commodity being purchased by the customer and the price thereof, the operation button image, and the like are displayed. In the example embodiment described herein, operators of the POS terminal 1 are the store clerk and the customer.

Hereinafter, unless the store touch panel 10a and the customer touch panel 10b are necessarily distinguished from each other, they may be simply referred to as a touch panel 10. Unless the store display 11a and the customer display 11b are necessarily distinguished from each other, they may be simply referred to as a display 11. In the present example, the touch panel 10 is a resistive film type touch panel, but it is not limited thereto, and it may be a capacitance type or the like. The display 11 is, for example, a liquid crystal display, but it is not limited thereto.

Various objects may be displayed or positioned around the touch panel 10. For example, a POP advertisement (Point of Purchase advertising) 3 is affixed to an upper part of a frame of the customer touch panel 10b. Typically, the POP advertisement 3 is affixed at a position where it does not physically contact with the customer touch panel 10b, but the POP advertisement 3 may be displaced downward over time, and may eventually contact with the customer touch panel 10b. In this case, the customer touch panel 10b may be pressed mistakenly by the POP advertisement 3.

The POS terminal 1 of the present example is not intended to receive simultaneous input from multiple touch panels 10. Specifically, if any one of multiple touch panels 10 (for example, customer touch panel 10b) is being pressed, other touch panel 10 (for example, store touch panel 10a), will not accept additional inputs or selections. Therefore, when the customer touch panel 10b is being pressed by the POP advertisement 3, an input operation by the customer on the customer touch panel 10b and an input operation by the store clerk on the store touch panel 10a will not be entered. Alternatively, since the customer touch panel 10b receives a pressing by the POP advertisement 3, and an input operation that was not intended by the customer or the store clerk will be entered.

Figure 2:
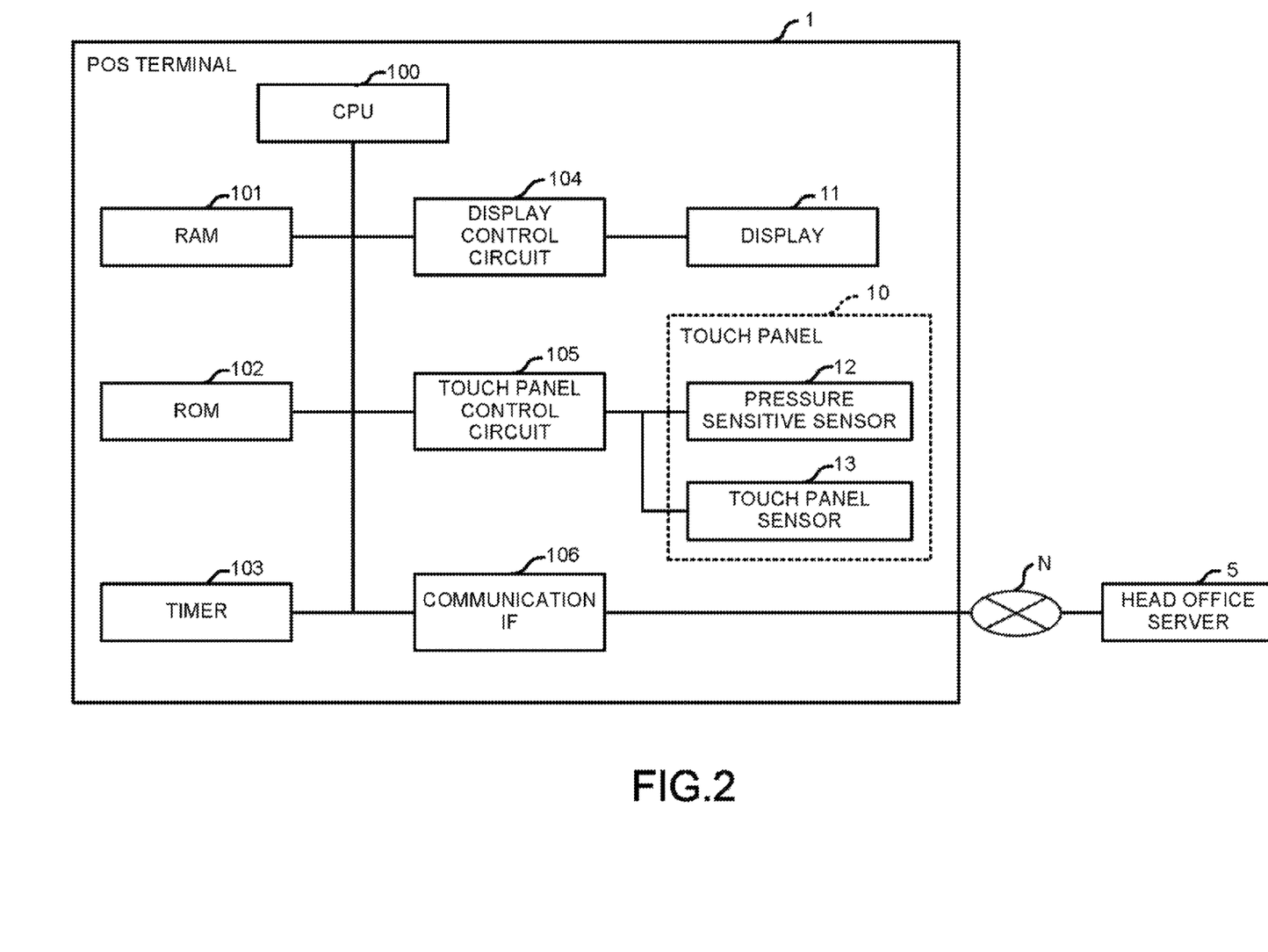
FIG. 2 is a diagram of a hardware configuration of a POS terminal according to the embodiment.

FIG. 2 is a diagram of the hardware configuration of the POS terminal 1. As shown in FIG. 2, the POS terminal 1 is a computer including a CPU (Central Processing Unit) 100, a RAM (Random Access Memory) 101, a ROM (Read Only Memory) 102, a timer 103, a display control circuit 104, a touch panel control circuit 105, the display 11, the touch panel 10, and a communication IF 106. The touch panel 10 includes a pressure sensitive sensor 12 and a touch panel sensor 13. The POS terminal 1 may further include a sound output device (not specifically depicted) or the like.

The touch panel sensor 13 is mainly composed of two panels laminated with resistive films. Electrodes are arranged in the two panels, respectively, and the touch panel sensor 13 detects a voltage fluctuation due to contact between the two panels.

The touch panel control circuit 105 controls an energized state of the touch panel sensor 13 in response to a control command from the CPU 100. The touch panel control circuit 105 converts the fluctuation of the voltage detected by the touch panel sensor 13 to a digital value and outputs it to the CPU 100 as a position coordinate indicating the position of the contact point (referred to as a pressed position). The position coordinate is a coordinate for specifying the position on the touch panel 10, and includes, for example, a coordinate in a vertical direction (Y coordinate) and a coordinate in a horizontal direction (X coordinate) in the touch panel 10.

The pressure sensitive sensor 12 is mounted at the back surface of the touch panel sensor 13 to measure a pressing force applied in a direction perpendicular to the touch panel 10. The pressure sensitive sensor 12 outputs the measured pressing force to the CPU 100.

The timer 103 is an RTC (Real Time Clock) or the like, and measures the current time. The display control circuit 104 controls display on the display 11 under the control of the CPU 100. The communication IF 106 is an interface for performing communication with a network N. The network N is, for example, an Internet or a LAN (Local Area Network). The communication IF 106 mutually communicates with a head office server 5 via the network N.

The head office server 5 is installed in a head office which is the management center of the retail store and receives information from the POS terminal 1 installed in the retail store. The head office server 5 is a computer having a normal hardware configuration. The head office server 5 is an example of a management device.

Figure 3:
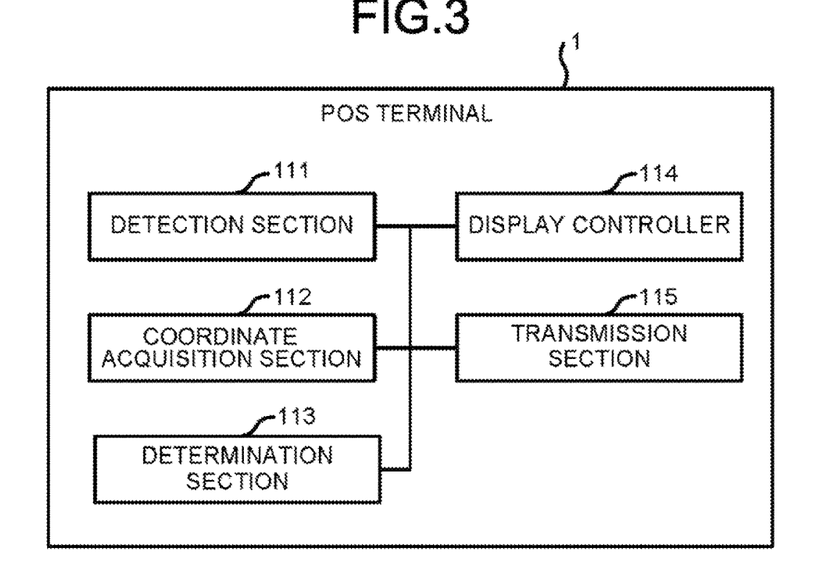
FIG. 3 is a block diagram of a function of a POS terminal according to the embodiment.

FIG. 3 is a block diagram of functions of the POS terminal 1. As shown in FIG. 3, the POS terminal 1 comprises a detection section 111, a coordinate acquisition section 112, a determination section 113, a display controller 114, and a transmission section 115.

The detection section 111 detects that the touch panel 10 is pressed by a store clerk or a surrounding object if a pressing force greater than or equal to a threshold value is measured by the pressure sensitive sensor 12. The detection section 111 detects completion of the pressing on the touch panel 10 if the pressing force measured by the pressure sensitive sensor 12 becomes less than the threshold value.

The coordinate acquisition section 112 acquires the position coordinate of the pressed position from the touch panel control circuit 105 if the detection section 111 detects that the touch panel 10 is pressed. The coordinate acquisition section 112 continuously acquires the position coordinate of the pressed position while the touch panel 10 is being pressed. For example, the coordinate acquisition section 112 continuously acquires the position coordinate by acquiring the position coordinate of the pressed position for each prescribed period while the touch panel 10 is being pressed. The coordinate acquisition section 112 is an example of an acquisition section in the example embodiment described herein.

Figure 4:
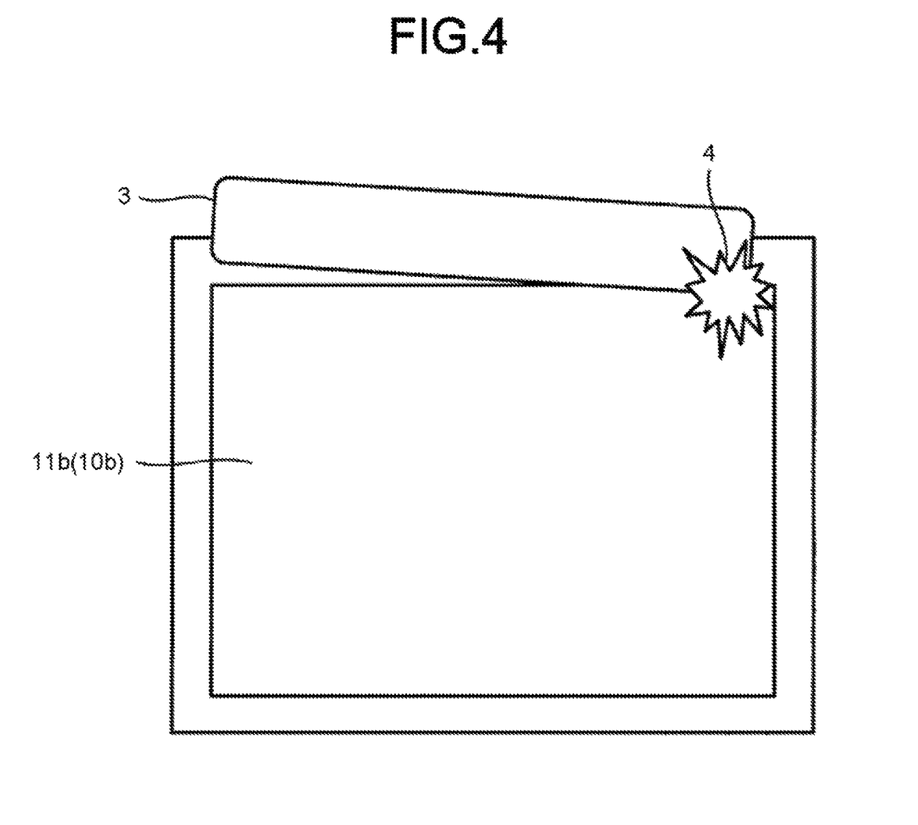
FIG. 4 is a diagram of pressing on a touch panel by a surrounding object according to the embodiment.

FIG. 4 is a diagram of pressing on the touch panel 10 by a surrounding object. In FIG. 4, the POP advertisement 3 (that is a surrounding object) is displaced downwards, and the contact point 4 on the customer touch panel 10b is continuously being pressed. In such a case, while the POP advertisement 3 is pressing the touch panel 10, the coordinate acquisition section 112 acquires the position coordinate indicating the position of the contact point 4 for each prescribed period. The POP advertisement 3 is an example of a surrounding object pressing the touch panel 10, and the surrounding object is not limited thereto.

Returning to FIG. 3, based on the position coordinate acquired by the coordinate acquisition section 112, the determination section 113 determines whether or not any position on the touch panel is continuously being pressed for a predetermined reference period of time or more. Specifically, the determination section 113 sets a predetermined reference period of time to the timer 103 if the detection section 111 detects that the touch panel 10 is being pressed. The predetermined reference period of time is, for example, 5 seconds, but not limited thereto. The predetermined reference period of time may be any time as long as it is longer than a duration time of pressing in a normal input operation. The means for measuring the predetermined reference period of time is not limited to the timer 103. Below, the predetermined reference period of time is simply referred to as reference period of time.

The determination section 113 determines that one position on the touch panel is continuously being pressed for the reference period of time or more if the coordinate acquisition section 112 continuously acquires the same position coordinate until the timer 103 times out, i.e., until the reference period of time elapses since the touch panel 10 is pressed. The "same position" also includes a case in which a difference between the position coordinate acquired at the start of pressing and the position coordinate acquired within the reference period of time is equal to or smaller than a threshold value in addition to a case in which both position coordinates are the same.

If the detection section 111 detects that the pressing is terminated before the elapse of the reference period of time since the touch panel 10 starts being pressed, the determination section 113 determines that the same position on the touch panel 10 is not continuously being pressed for the reference period of time or more, and resets the timer 103. If the position coordinate acquired by the coordinate acquisition section 112 does not coincide the position coordinate acquired at the start of pressing before the elapse of the reference period of time since the touch panel is pressed, the determination section 113 determines that the same position on the touch panel 10 is not being pressed continuously for the reference period of time or more, and resets the timer 103.

The display controller 114 controls the display 11 via the display control circuit 104. If the determination section 113 determines that the same position on the touch panel 10 is being pressed continuously for the reference period of time or more, the display controller 114 displays an image or a message indicating a pressing position corresponding to the position coordinate on the display 11. As the touch panel 10 being pressed is laminated on the display 11, the display controller 114 can clearly indicate the pressed position on the touch panel 10 by displaying an image on the display 11. Details of images to be displayed are described later.

As shown in FIG. 1, the POS terminal 1 includes multiple touch panels 10. In such a POS terminal 1, the display controller 114 displays a message indicating the touch panel 10 being pressed on the store display 11a if the determination section 113 determines that the same position is continuously being pressed for the reference period of time or more on any of the multiple touch panels 10. Details of the displayed message are described later.

If the detection section 111 detects that the pressing on the touch panel 10 is terminated, the display controller 114 terminates the display of the image or message indicating the pressing position and the message indicating the touch panel 10 being pressed. Therefore, if the surrounding object is removed and the image indicating the pressing position is no longer displayed on the display 11, the store clerk can recognize that the touch panel 10 is ready for input.

The display controller 114 is an example of a notification section. A method of notifying the store clerk is not limited to the display on the display 11, and a sound message, a warning sound, or the like may be issued by a sound output device (not specifically depicted).

The transmission section 115 transmits information indicating the touch panel 10 being pressed to the head office server 5 if the determination section 113 determines that the same position on the touch panel 10 is continuously being pressed for the reference period of time or more. The information that can specify the touch panel 10 is, for example, identification information such as an ID of the touch panel 10, but it is not limited thereto. If there are multiple stores managed by the head office and multiple POS terminals 1, the transmission section 115 further transmits information indicating the retail store where the POS terminal 1 is installed and the POS terminal 1 at the retail store. The information that is transmitted to the retail store and the POS terminal 1 is, for example, identification information such as a name of the retail store, an ID of the retail store, an ID of the POS terminal 1 or the like, but it is not limited thereto. A method of transmitting the information from the transmission section 115 to the head office server 5 may be a RAS (Remote Access Service) notification, but not limited thereto.

By transmitting the information from the transmission section 115 to the head office server 5, it is possible to store a history in which the same position on the touch panel 10 is continuously being pressed for the reference period of time or more. Therefore, even after the pressing on the touch panel 10 is terminated and the display of the image indicating the pressed position on the display 11 disappears, the reason why the input operation is not correctly received can be easily specified. It is easier to analyze the reason why the touch panel 10 is pressed by the surrounding object when similar events occur in multiple retail stores at a later time.

Figure 5:
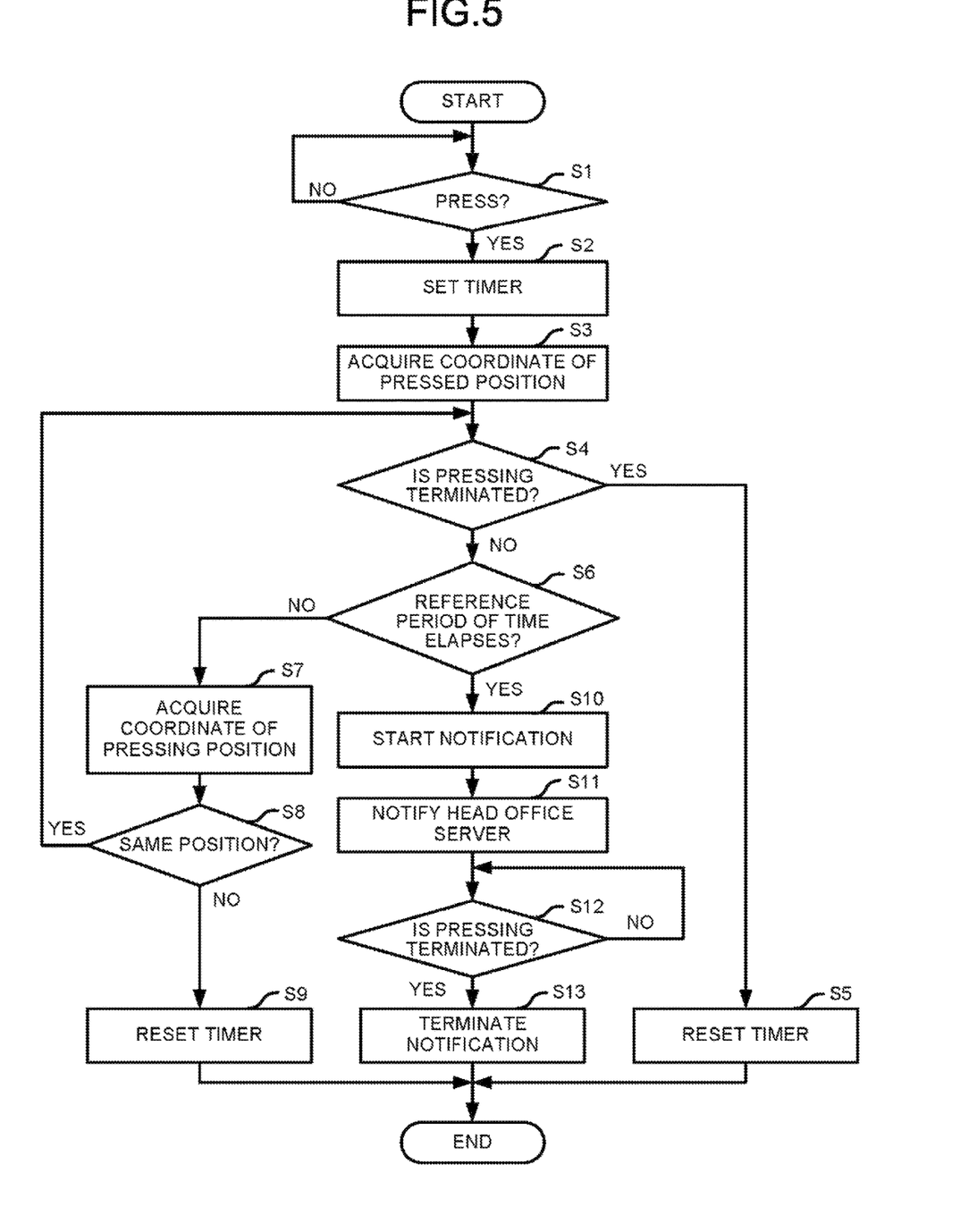
FIG. 5 is a flowchart for depicting an example of a flow of a process executed by a POS terminal according to the embodiment.

Next, a process executed by the POS terminal 1 configured as described above is described. FIG. 5 is a flowchart for depicting an example of the flow of a process executed by the POS terminal 1. The processing of the flowchart is started, for example, when a power supply of the POS terminal 1 is turned on.

The detection section 111 acquires the pressing force measured by the pressure sensitive sensor 12, and detects that the touch panel 10 is pressed (Yes in Act S1) if the pressing force is equal to or more than a threshold value. If the pressing force is less than the threshold value, the detection section 111 determines that the touch panel 10 is not pressed, and repeats the process in Act S1 (No in Act S1).

If the detection section 111 detects that the touch panel 10 is pressed, the determination section 113 sets a reference period of time to the timer 103 (Act S2). The coordinate acquisition section 112 acquires the position coordinate of the pressed position from the touch panel control circuit 105 (Act S3).

The detection section 111 determines whether or not the pressing on the touch panel 10 is terminated (Act S4). If the pressing on the touch panel 10 is terminated before the reference period of time elapses (Yes in Act S4), the determination section 113 resets the timer 103 and terminates the processing (Act S5).

If the pressing on the touch panel 10 is not terminated (No in Act S4), the determination section 113 determines whether or not the reference period of time has elapsed (Act S6). When the reference period of time has not elapsed (No in Act S6), the coordinate acquisition section 112 acquires the position coordinate (Act S7).

The determination section 113 determines whether or not the position coordinate acquired in Act S7 indicates the same position as the position coordinate acquired in Act S3 (Act S8). If these position coordinates do not indicate the same position (No in Act S8), the determination section 113 resets the timer 103 and terminates the process (Act S9). If these position coordinates indicate the same position (Yes in Act S8), the flow returns to the process in Act S4.

If the reference period of time has elapsed (Yes in Act S6), the determination section 113 determines that the same position on the touch panel 10 is continuously being pressed for the reference period of time or more. In this case, the display controller 114 starts notifying the store clerk and the customer (Act S10). For example, if the customer touch panel 10b is pressed as shown in FIG. 4, the display controller 114 displays the image or the message indicating the pressed position corresponding to the position coordinate on the customer display 11b.

Figure 6:
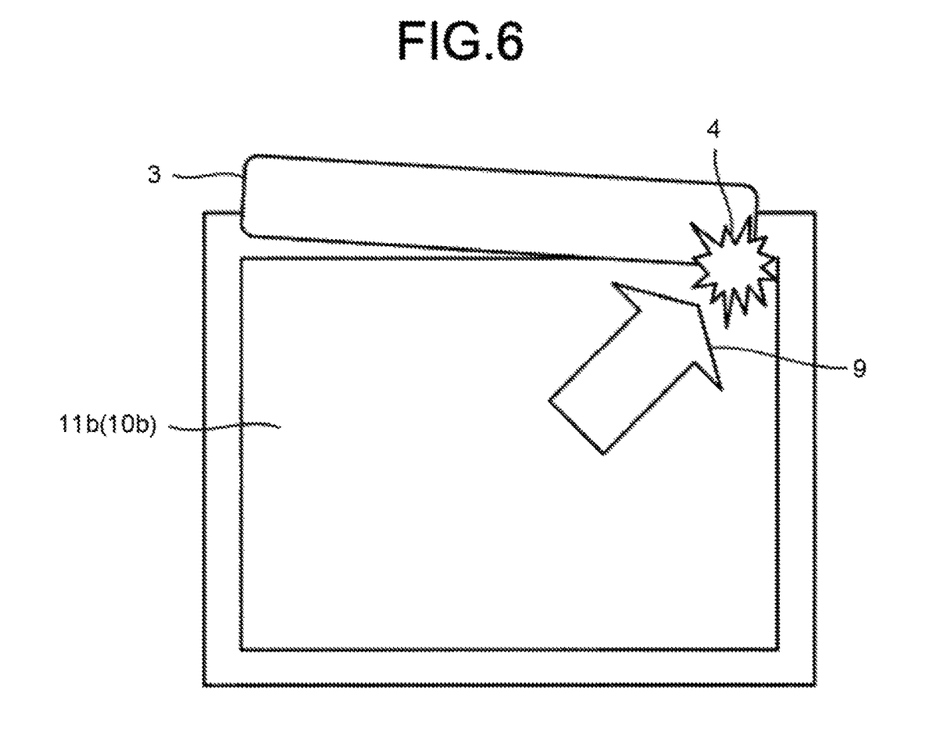
FIG. 6 is a diagram of a display on a customer display according to the embodiment.

FIG. 6 is a diagram illustrating an example of the display on the customer display 11b according to the present embodiment. As in FIG. 4, the POP advertisement 3 is in contact with the customer display 11b at the contact point 4 and presses the customer touch panel 10b. In such a case, as shown in FIG. 6, the display controller 114 displays, on the customer display 11b, an arrow 9 indicating the pressed position (that is the contact point 4) on the customer touch panel 10b. The arrow 9 is an example of the image indicating the pressed position corresponding to the position coordinate, and the shape of the image is not limited thereto. The display controller 114 may display a text message or the like for indicating the pressed position instead of the arrow 9 on the customer display 11b.

Figure 7:
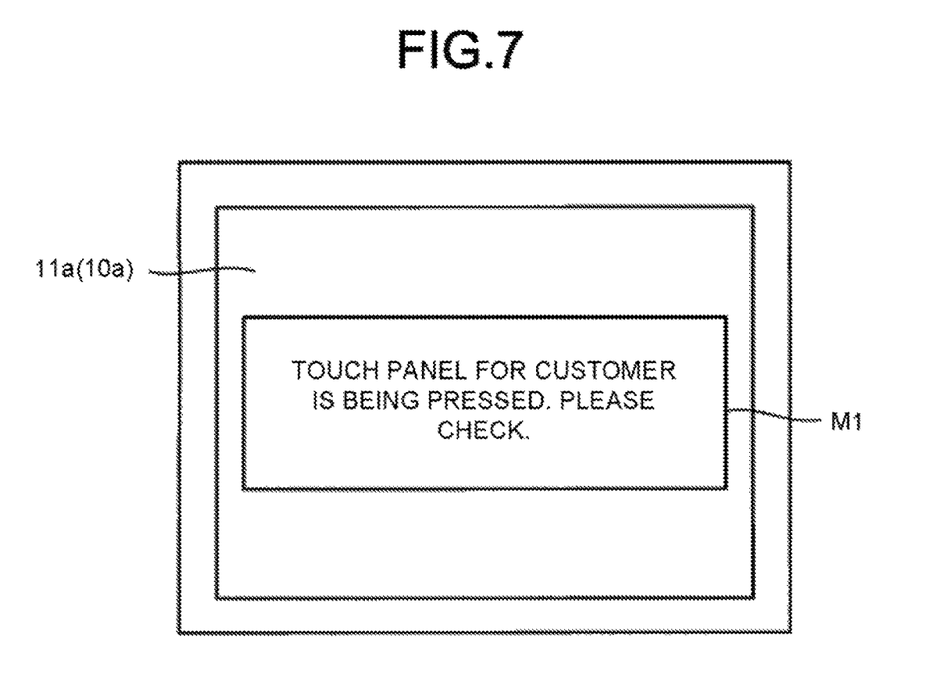
FIG. 7 is a diagram of a display on a store display according to the embodiment.

If the customer touch panel 10b is pressed, the arrow 9 displayed on the customer display 11b may not be easily seen by the store clerk. Therefore, the display controller 114 displays a message on the store display indicating that the customer touch panel 10b is pressed 11a. FIG. 7 is an example message on the store display 11a. As shown in FIG. 7, the display controller 114 displays a message M1 that indicates that the customer touch panel 10b is pressed on the store display 11a (also referred to as a second display). With such a display, the store clerk can more easily recognize that the customer touch panel 10b is being pressed. The message M1 is an example of a message that indicates the touch panel 10 being pressed, and a content of the displayed message is not limited to the example shown in FIG. 7.

In FIG. 6 and FIG. 7, an example in which the customer touch panel 10b is pressed is described. However, if the store touch panel 10a is pressed, the display controller 114 displays the arrow 9 indicating the pressed position on the store display 11a. In this case, the display controller 114 may not display the message M1, and may display both the arrow 9 and the message M1 on the store display 11a.

The transmission section 115 transmits the information indicating the touch panel 10 being pressed to the head office server 5 (Act S11).

Based on the pressing force measured by the pressure sensitive sensor 12, the detection section 111 determines whether or not the pressing on the touch panel 10 is terminated (Act S12). If the pressing force is not less than the threshold value, the detection section 111 determines that the pressing on the touch panel 10 is not terminated (No in Act S12). In this case, the detection section 111 repeats the process in Act S12.

If the pressing force is less than the threshold value, the detection section 111 determines that the pressing on the touch panel 10 is terminated (Yes in Act S12).

If the detection section 111 determines that the pressing on the touch panel 10 is terminated (Yes in Act S12), the display controller 114 terminates the display of the arrow 9 and the message M1 shown in FIG. 6 and FIG. 7 and terminates the notification (Act S13).

According to the POS terminal 1 in the example embodiment described above, as the notification is performed if the same position on the touch panel 10 is continuously being pressed for the reference period of time or more, the store clerk or the customer can easily recognize that the touch panel 10 is mistakenly being pressed by the surrounding object. Therefore, the store clerk can remove the surrounding object pressing the touch panel 10, and can quickly resume the use of the POS terminal 1. In the POS terminal 1, since occurrence of failure in the POS terminal 1 is correctly accessed, inspection work by an engineer or the like may not be needed and the work load can be reduced.

In the POS terminal 1, as the image or the message indicating the position coordinate of the pressed position is displayed on the display 11, the store clerk or the customer can easily recognize which position of the touch panel 10 is pressed by the surrounding object.

In the POS terminal 1, if it is determined that the same position is continuously being pressed for the reference period of time or more on any of the multiple touch panels 10, the message M1 indicating the touch panel being pressed is displayed on the store display 11a. Therefore, in the POS terminal 1, even if the touch panel 10 not facing the store clerk is pressed, the store clerk can easily recognize that the touch panel 10 is being pressed.

In the POS terminal 1, if it is determined that the same position on the touch panel 10 is being continuously being pressed for the reference period of time or more, as the information indicating the touch panel 10 being pressed is sent to the head office server 5, a manager of the head office or the like can easily recognize that the touch panel 10 is pressed by the surrounding object. With such a configuration, even after termination of the press on the touch panel 10 by the surrounding object, the cause of failure in receiving the input operation can be easily accessed.

In the POS terminal 1, since the notification is terminated if it is detected that the pressing on the touch panel 10 is terminated, the store clerk or the like can easily recognize that the touch panel 10 is ready for a further input.

(Modification) In the POS terminal 1 according to the example embodiment described above, the notification is performed if it is determined that the same position on the touch panel 10 is continuously being pressed for the reference period of time or more, but the present invention is not limited thereto. For example, the POS terminal 1 may perform notification if the touch panel 10 is continuously being pressed for the reference period of time or more regardless of whether or not the coordinates of the pressed positions are the same. More specifically, if the touch panel 10 is continuously being pressed for the reference period of time or more, as shown in FIG. 6 and FIG. 7, the display controller 114 may display an image, a message or the like indicating that the touch panel 10 is pressed on the display 11. In such a case, the POS terminal 1 may issue a sound message, a warning sound or the like by the sound output device (not specifically depicted) to perform the notification. In this modification example embodiment, even if the coordinate of the position being pressed is changed by movement of a surrounding object pressing the touch panel 10, the store clerk or the customer can easily recognize pressing by the surrounding object.

The POS terminal 1 is described as an example, but the information processing apparatus including the touch panel 10 is not limited thereto. The configurations according to the example embodiments described above may be applicable to various devices including the touch panel 10.

In the example embodiments described above, the touch panel 10 is laminated on the display 11, but the touch panel 10 and the display 11 may be separately from each other. For example, the touch panel 10 may be a switch or the like not having the display 11.

The number of the touch panels 10 and the number of the displays 11 provided in the POS terminal 1 are not limited to two as shown in FIG. 1, and more devices may be used.

A program executed by the POS terminal 1 in the example embodiments described above is incorporated in advance in a ROM or the like. However, the program executed by the POS terminal 1 may be provided in a computer-readable recording medium such as a CD-ROM, a flexible disk (FD), a CD-R, and a DVD (Digital Versatile Disk) in a file in an installable format or executable format.

The program executed by the POS terminal 1 may be stored on a computer connected to the network such as the Internet to be provided by being downloaded via the network. The program executed by the POS terminal 1 may be provided or distributed via the network such as the Internet.

The program executed in the POS terminal 1 in the example embodiments described above has a module configuration including each section (for example, the detection section, the coordinate acquisition section, the determination section, the display controller, and the transmission section). The CPU (referred to as a processor) reads the program to be executed by the POS terminal 1 from the storage medium, and loads each of the above sections on a main storage device. As a result, the detection section, the coordinate acquisition section, the determination section, the display controller, and the transmission section are generated on the main storage device.

While certain embodiments have been described, these embodiments have been presented by way of example only, and are not intended to limit the scope of the invention. Indeed, the novel embodiments described herein may be embodied in a variety of other forms. Furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A point-of-sale terminal, comprising:
   a customer-side display directable to a customer side;
   a clerk-side display directable to a clerk side different from the customer side;
   a touch panel including a touch sensor, the touch panel being overlapped with the customer-side display; and
   a processor configured to:
      determine that the touch panel is being touched at a first position for a reference period or more based on detection of a touch at the first position by the touch sensor;
      acquire a first position coordinate of the first position on the touch panel that is being touched;
      cause the customer-side display to generate a first notification and the clerk-side display to generate a second notification different from the first notification upon determining that the touch panel is being touched for the reference period or more at the first position.

2. The point-of-sale terminal according to claim 1, further comprising:
   a timer, wherein
   the processor is further configured to:
      start the timer upon start of the detection at the first position by the touch sensor, and
      reset the timer upon end of the detection at the first position by the touch sensor.

3. The point-of-sale terminal according to claim 1, wherein
   the first notification includes an image displayed on the customer-side display, the image pointing the first position coordinate.

4. The point-of-sale terminal according to claim 3, further comprising:
   the second notification includes a text message on the clerk-side display, the text message indicating the touch panel is being touched.

5. The point-of-sale terminal according to claim 1, wherein the processor is further configured to transmit information to a server upon determining that the touch panel is being touched for the reference period or more, the information indicating the touch panel is being touched.

6. The point-of-sale terminal according to claim 1, wherein the processor is further configured to:
   determine that the touch on the touch panel at the first position is terminated based on non-detection of the touch at the first position by the touch sensor, and
   terminate the first and second notifications upon determining that the touching on the touch panel at the first position is terminated.

7. The point-of-sale terminal according to claim 1, wherein the customer side is opposite to the clerk side.

8. A method for notifying an input failure on a point-of-sale terminal including a customer-side display directed to a customer side, a clerk-side display directed to a clerk side different from the customer side, and a touch panel overlapped with the customer-side display, comprising:
   detecting that touch panel is being touched at a first position for a predetermined reference period or more;
   acquiring a first position coordinate of the first position; and
   providing a first notification with the customer-side display and a second notification with the clerk-side display upon detecting that the touch panel is being touched at the first position for the predetermined reference period or more.

9. The method according to claim 8, further comprising:
   starting a timer upon start of the detecting at the first position and
   resetting the timer upon end of the detecting at the first position.

10. The method according to claim 8, wherein
    the first notification includes an image displayed on the customer-side display, the image pointing the first position coordinate.

11. The method according to claim 10, wherein the second notification includes a text message on the clerk-side display, the text message indicating the touch panel is being touched.

12. The method according to claim 8, further comprising:
    transmitting information to a server upon determining that the touch panel is being touched for the predetermined reference period or more, the information indicating the touch panel is being touched.

13. The method according to claim 8, further comprising:
    detecting that the touch on the touch panel at the first position is terminated; and
    terminating the first and second notifications upon determining that the touch on the touch panel at the first position is terminated.

14. The method according to claim 8, wherein the customer side is opposite to the clerk side.

* * * * *